US006594360B1

United States Patent
Gazsi et al.

(10) Patent No.: US 6,594,360 B1
(45) Date of Patent: Jul. 15, 2003

(54) CIRCUIT CONFIGURATION FOR TWO-WIRE/FOUR-WIRE CONVERSION

(75) Inventors: Lajos Gazsi, Düsseldorf (DE); Jörg Hauptmann, Wernberg (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/357,249

(22) Filed: Jul. 20, 1999

Related U.S. Application Data (63) Continuation of application No. PCT/DE98/00169, filed on Jan. 20, 1998.

(30) Foreign Application Priority Data

Jan. 20, 1997 (DE) .......................... 197 01 785

(51) Int. Cl.⁷ .................... H04M 1/00; H04M 9/00; H04M 9/08
(52) U.S. Cl. .................. 379/406.08; 379/406.06; 379/406.16; 379/406.07
(58) Field of Search ................. 379/345, 347, 379/406.01–406.16, 387.01–391.01

(56) References Cited

U.S. PATENT DOCUMENTS 5,051,981 A 9/1991 Kline
5,585,802 A 12/1996 Cabler et al.

FOREIGN PATENT DOCUMENTS

EP 0122594 A2 10/1984
EP 0464500 A2 1/1992

OTHER PUBLICATIONS

John A. C. Bingham: "Multicarrier Modulation for Data Transmission: An Idea Whose Time Has Come" May 1990 IEEE Communications Magazine, pp. 5–14.

Stephen Fleming: "ADSL: The on–ramp to the information highway", Telephony Jul. 12, 1993, pp. 20–26.

Minnie Ho et al: "High Speed Full–Duplex Echo Cancellation For Discrete Multitone Modulation", 1993 IEEE, pp. 772–776.

Primary Examiner—Duc Nguyen
(74) Attorney, Agent, or Firm—Laurence A. Greenberg; Werner H. Stemer; Gregory L. Mayback (57) ABSTRACT

The invention relates to a circuit configuration for two-wire/four-wire conversion. The circuit configuration has a receiver which is coupled on an input side to a digital two-wire reception path via which its receives a digital signal. A signal-processor is connected downstream of the receiver and emits a first and second signal. An echo-canceling device receives the first signal and emits a third signal. A digital-to-analog converter is provided which receives the second signal and emits a fourth signal. A hybrid circuit is coupled to an analog four-wire transmission-reception path, receives the fourth signal, and emits a fifth signal. An analog-to-digital converter receives the fifth signal and emits a sixth signal. A transmitter receives the sixth signal and is coupled on an output side to a digital two-wire transmission path and emits a digital transmitted signal to the latter. In the invention, the digital-to-analog converter has a sigma-delta modulator.

5 Claims, 7 Drawing Sheets

CIRCUIT CONFIGURATION FOR TWO-WIRE/FOUR-WIRE CONVERSION

CROSS-REFENCE TO RELATED APPLICATION

This application is a continuation of copending International Application PCT/DE98/00169, filed Jan. 20, 1998, which designated the United States.

BACKGROUND OF THE INVENTION

Field of the Invention

The invention relates to a circuit configuration for two-wire/four-wire conversion. The circuit configuration has a receiver which is coupled on an input side to a digital two-wire reception path via which its receives a digital signal. A signal-processor is connected downstream of the receiver and emits a first and second signal. An echo-canceling device receives the first signal and emits a third signal. A digital-to-analog converter is provided which receives the second signal and emits a fourth signal. A hybrid circuit is coupled to an analog four-wire transmission-reception path, receives the fourth signal, and emits a fifth signal. An analog-to-digital converter receives the fifth signal and emits a sixth signal. A transmitter receives the sixth signal and is coupled on an output side to a digital two-wire transmission path and emits a digital transmitted signal to the latter.

Such circuit configurations are known, for example from Published, European Patent Application EP 0 122 594 A, U.S. Pat. No. 5,051,981 and in multifarious configurations, for example from International Patent Application WO 95/17049. In this case, use is made, in particular, of a method for reducing clipping or quantization effects of digital-to-analog converters in the transmission path of the echo-canceling unit. Systems particularly suitable for ADSL, which use multi-carrier modulation, are also described, inter alia, in John A. C. Bingham, IEEE Communications Magazine, Vol. 28, No. pages 5–14, May 1990, in S. Fleming et al., Telephony, Jul. 12, 1993, pages 20–26 and in M. Ho et al., 1993 International Conference on Communications, pages 772–776, May 1993. One problem with these three last-named configurations is that noise caused by clipping and quantization cannot be eliminated by conventional echo-canceling systems, for which reason the transmission properties of the transmission system are negatively affected. These effects are substantially reduced with the aid of the method and transmission systems presented in International Patent Application WO 95/17049. However, in this case increased demands are made, in particular, on the quality of the digital-to-analog conversion. The digital-to-analog conversion should be virtually ideal in this case, and so digital-to-analog converters that do not meet the Nyquist criterion are unsuitable.

However, suitable digital-to-analog converters require both a high outlay in terms of circuitry, and a high outlay on compensation, for which reason they are less suitable for implementation in integrated circuit technology. By contrast, digital-to-analog converters operating according to the sigma-delta modulator principle are very well suited for implementation in integrated circuit technology. However, these converters do not meet the Nyquist criterion, and therefore cannot be used straight away in the systems described in International Patent Application WO 95/17049. A suitable digital-to-analog converter is known, for example, from U.S. Pat. No. 5,585,802.

SUMMARY OF THE INVENTION

It is accordingly an object of the invention to provide a circuit configuration for two-wire/four-wire conversion which overcomes the above-mentioned disadvantages of the prior art devices of this general type, which can be more effectively integrated even in the case of the use of the known method for reducing clipping and quantization effects.

With the foregoing and other objects in view there is provided, in accordance with the invention, a circuit configuration for two-wire/four-wire conversion, including:

- a receiver having an input side to be coupled to a digital two-wire reception path and receiving a digital signal;
- a signal-processor connected downstream of the receiver and emitting a first signal and a second signal;
- an echo-cancellation unit receiving the first signal and emitting a third signal;
- a digital-to-analog converter receiving the second signal and emitting a fourth signal, the digital-to-analog converter having an interpolation filter receiving the second signal, a digital noise-shaping filter connected downstream of the interpolation filter, and an analog reconstruction filter connected in turn, downstream, of the noise-shaping filter, the digital noise-shaping filter generating a seventh signal;
- a hybrid circuit to be coupled to an analog four-wire transmission-reception path and receiving the fourth signal, the hybrid circuit emitting a fifth signal;
- an analog-to-digital converter receiving the fifth signal and emitting a sixth signal;
- an approximation filter connected downstream of the digital noise-shaping filter and receiving the seventh signal and generating a filtered output signal;
- an echo-estimating filter disposed downstream of the approximation filter and receiving the filtered output signal from the approximation filter and outputting an output signal;
- a subtractor receiving the output signal from the echo-estimating filter being subtractively superimposed with the sixth signal and outputting a transmit signal; and
- a transmitter receiving the transmit signal, having an output side to be coupled a digital two-wire transmission path, and emitting a digital transmitted signal to the digital two-wire transmission path.

The circuit configuration has a sigma-delta modulator as the digital-to-analog converter. In particular, the digital-to-analog converter contains as the sigma-delta modulating device the interpolation filter, to which the second signal is fed, the digital noise-shaping filter connected downstream of the interpolation filter, and the analog reconstruction filter connected, in turn, downstream of the noise-shaping filter. The fourth signal can be tapped in this care at the output of the analog reconstruction filter. The second signal is digitally interpolated in the interpolation filter and thus conditioned for the following oversampling. The downstream noise-shaping filter generates from the N bit of the digital signal at the output of the interpolation filter a 1-bit wide pulse modulation signal with the use of a plurality of, for example 1 to 6, feedback loops. The analog signal is reconstructed from the 1-bit wide digital bit stream by an analog filter such as, for example, an RC circuit or a switch-capacitor network.

According to the invention, the output signal of the digital noise-shaping filter is fed to the approximation filter downstream of which, in turn, the echo-estimating filter is connected. The output signal of the echo-estimating filter is in this case subtractively superimposed on the output signal of the analog-to-digital converter, specifically the sixth signal. The approximation filter serves the purpose of approximating the analog reconstruction filter. A DAC estimation filter is therefore involved, inter alia. Therefore, the analog signal at the output of the analog reconstruction filter, specifically the fourth signal, is approximated by the digital signal at the output of the approximation filter. Moreover, the oversampled signal in the approximation filter is reduced to the sampling rate used in the overall circuit configuration. The behavior of the hybrid circuit and of the analog transmission-reception path are approximated adaptively by the echo-estimating filter. It is advantageous in this case that both linear signals and nonlinear signals, produced during digital noise shaping, for example, are compensated.

Moreover, the above-mentioned development of the invention can be extended by a delay-estimating filter, to which, on the input side, the second signal, is fed, and whose output signal is subtractively superimposed on the output signal of the approximation filter with the output signal of the approximation filter and is fed together therewith to the echo-estimating filter. The result of this is that only the nonlinear signal component produced in the digital noise-shaping filter is passed on and, consequently, that the echo-estimating filter can be implemented in a simpler way and thus with a lower outlay. The delay-estimating filter is constructed in this case in such a way that the time delay and the amplitude response of the interpolation filter are compensated.

In another development of the invention, a dedicated digital decimation filter that is connected downstream of the approximation filter is used for the purpose of reducing the sampling rate. The echo-estimating filter is consequently located downstream of the digital decimation filter. In accordance with the development, the output signal of the interpolation filter is subtractively superimposed on the output signal of the approximation filter, and thus fed to the digital decimation filter. By splitting up the approximation filter into a purely approximating ("estimating") part and into a decimation part, the subtraction is carried out at high sampling rates, it being possible to omit compensation of the delay time.

Furthermore, it is also possible to provide downstream of the digital decimation filter a hybrid compensation unit— also known as hybrid estimation filter—which approximates the nonlinearities, for example of the line drivers in the hybrid circuit. The approximation is performed, for example, via a nonlinear characteristic that is applied to the digital bit stream at the output of the digital decimation filter. Furthermore, the output signal of the echo-estimating filter can be combined in series with the output signal of the analog-to-digital converter with the interposition of the further interpolation filter, the further digital noise-shaping filter and the further decimation filter. The configuration composed of the further interpolation filter, the further digital noise-shaping filter and the further decimation filter serves to simulate the transmission properties of the analog-to-digital converter.

Moreover, it can be provided that the signal-processor additionally emits a seventh signal which is fed to the transmitter in a fashion subtractively combined with the sixth signal, with the interposition of the echo estimation unit, and/or that the signal-processor additionally emit an eighth signal which is provided for controlling the echo-cancellation unit.

Finally, further signal processors are connected between the analog-to-digital converter and the transmitter.

Other features which are considered as characteristic for the invention are set forth in the appended claims.

Although the invention is illustrated and described herein as embodied in a circuit configuration for two-wire/four-wire conversion, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIGS. 1–8 thereof. The embodiments shown in FIGS. 1 to 8 are described in detail in International Patent Application Wo 95/17049 as regards their construction and mode of operation. Reference is therefore made to the explanations set forth there. The embodiments represented in FIGS. 1 to 8 all have a receiver 10 or 40 which are coupled on an input side to a digital two-wire reception path 12. Connected downstream of the receiver 10 or 40 is a signal-processor 28 which emits a first and second signal. The first signal is fed in this case to an echo-cancellation unit 26 or 58 that emits a third signal. The second signal is applied to a digital-to-analog converter 14, whose output signal, a fourth signal, is fed to a hybrid circuit 16. The latter is coupled to an analog four-wire transmission-reception path 18 and emits a fifth signal, which is provided as input signal for an analog-to-digital converter 20.

Connected downstream of the analog-to-digital converter 20 is a transmitter 22 which, in addition to an output signal of the analog-to-digital converter 20, specifically a sixth signal, are also fed the output signal of the echo-cancellation unit 26, 58, specifically the third signal. The transmitter 22 or 56 is coupled on an output side to a digital two-wire transmission path 24.

According to the invention, the digital-to-analog converter 14 operates in this case according to a sigma-delta modulation principle.

It can be provided in this case that the signal-processor 28 additionally emits a seventh signal E, which is fed to the transmitter 22 or 56 in a fashion subtractively combined with the sixth signal, with the interposition of an echo estimating filter 30 and/or that the signal-processor 28 additionally emits an eighth signal which is provided for controlling the echo-cancellation unit 26 or 58. It is also possible for further devices for signal processing 50, 52 to be connected between the analog-to-digital converter 20 and the transmitter 22.

Figure 1:
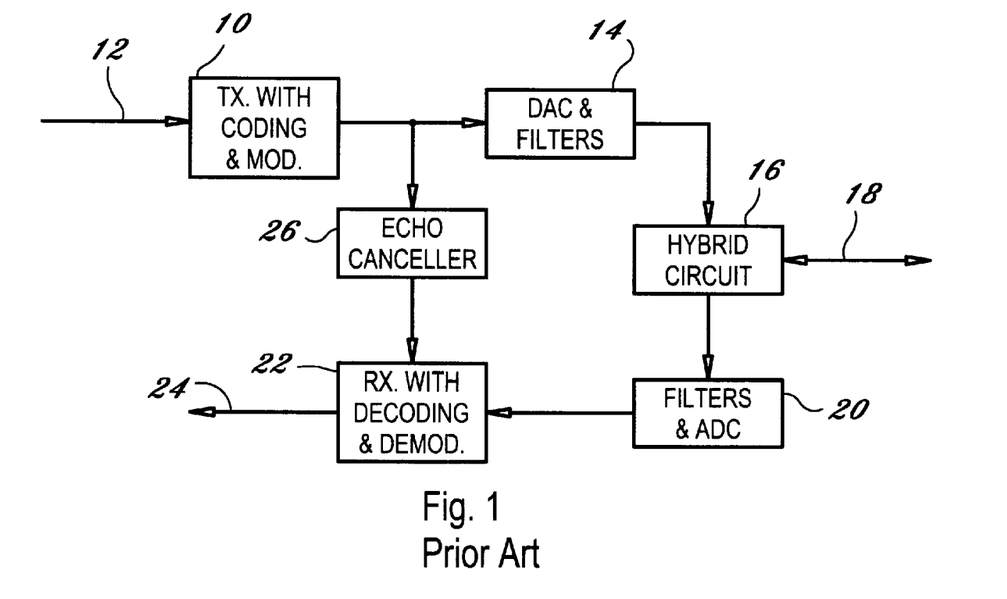
FIGS. 1 to 8 are diagrammatic, block diagrams showing a principle of configurations of a circuit configuration according to the prior art.
Figure 2:
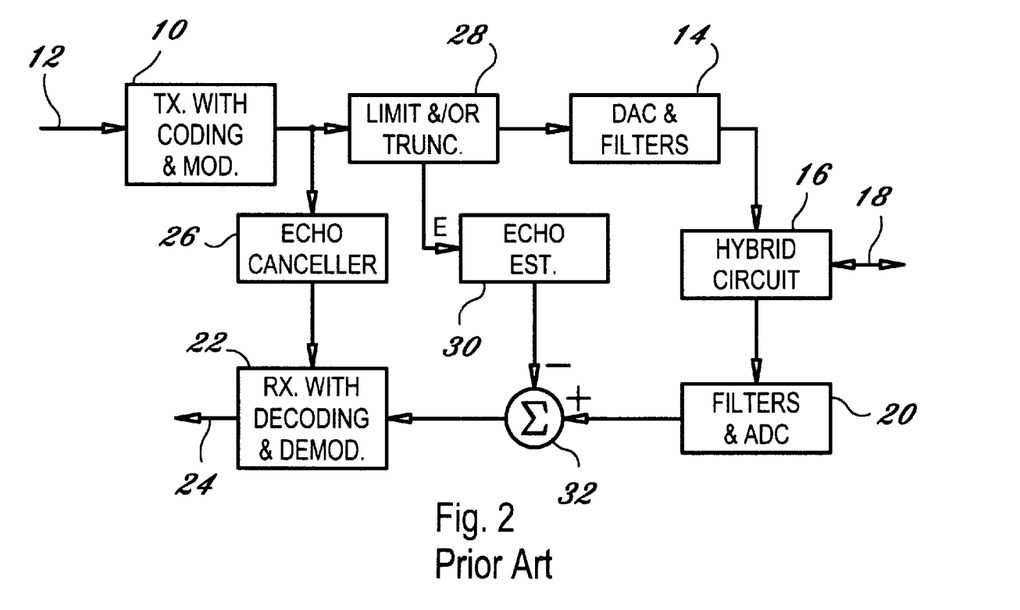
Figure 3:
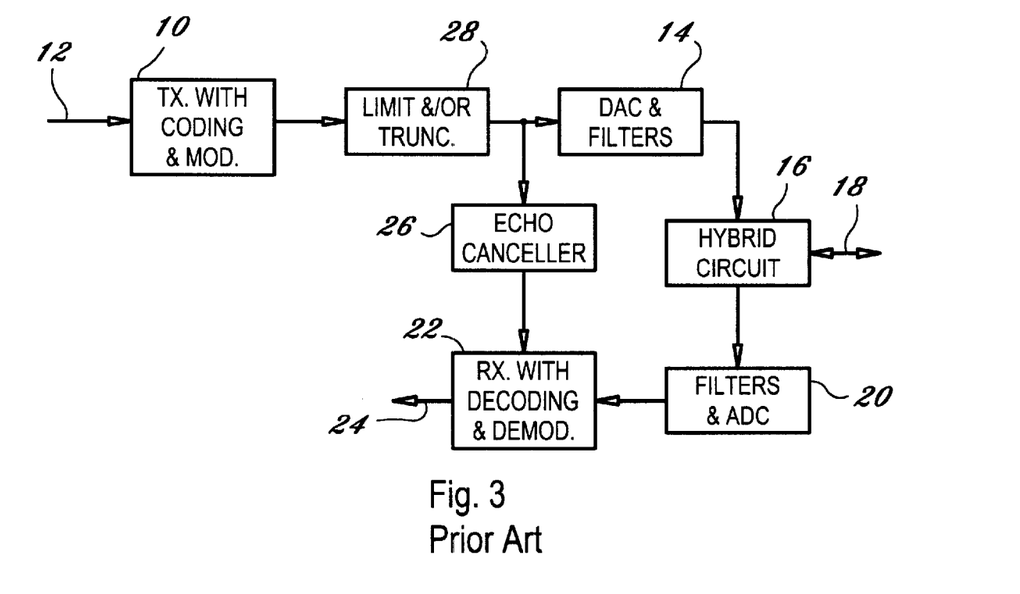
Figure 4:
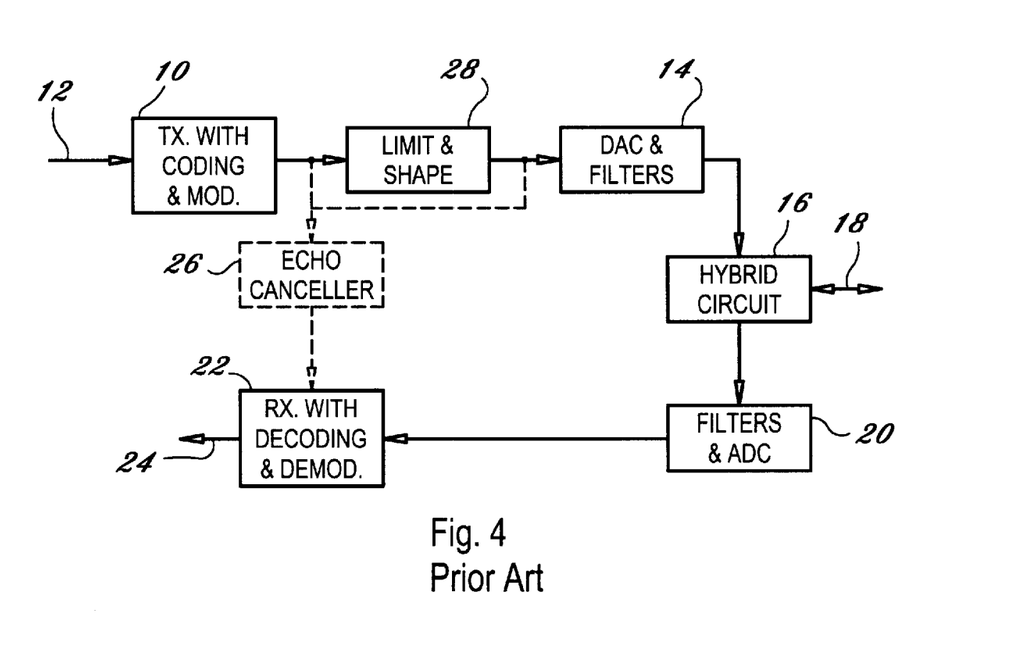
Figure 5:
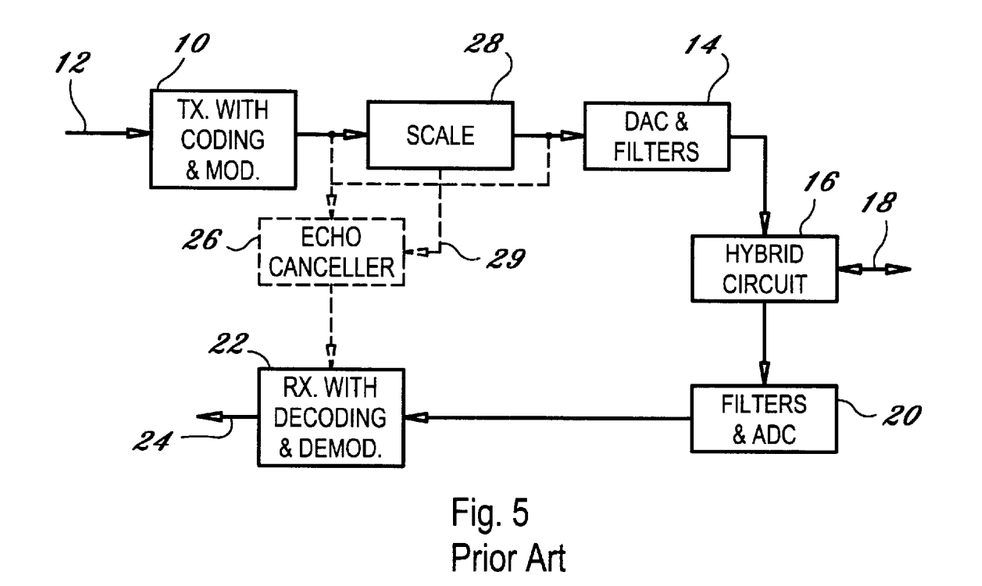
Figure 6:
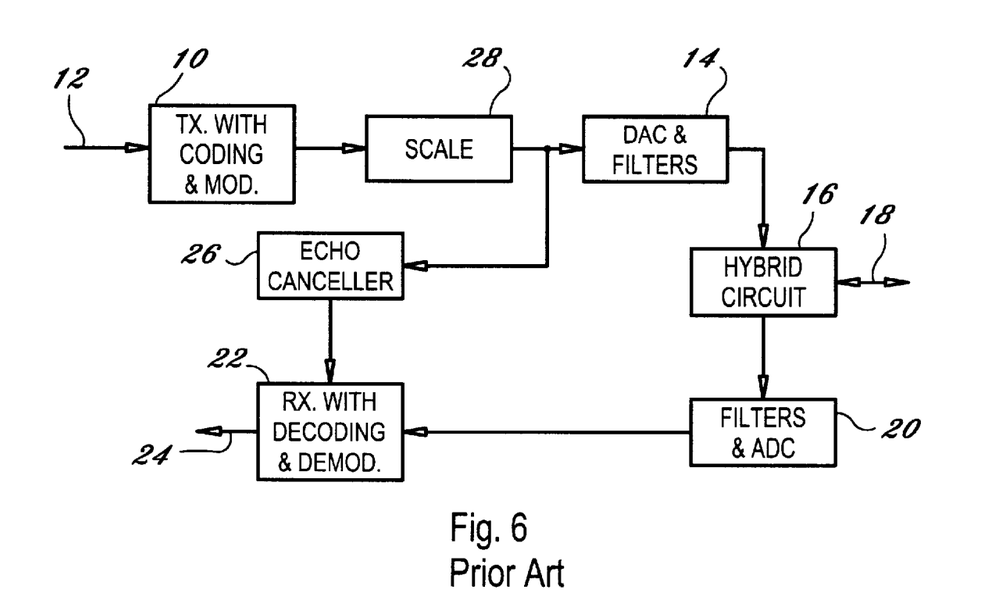
Figure 7:
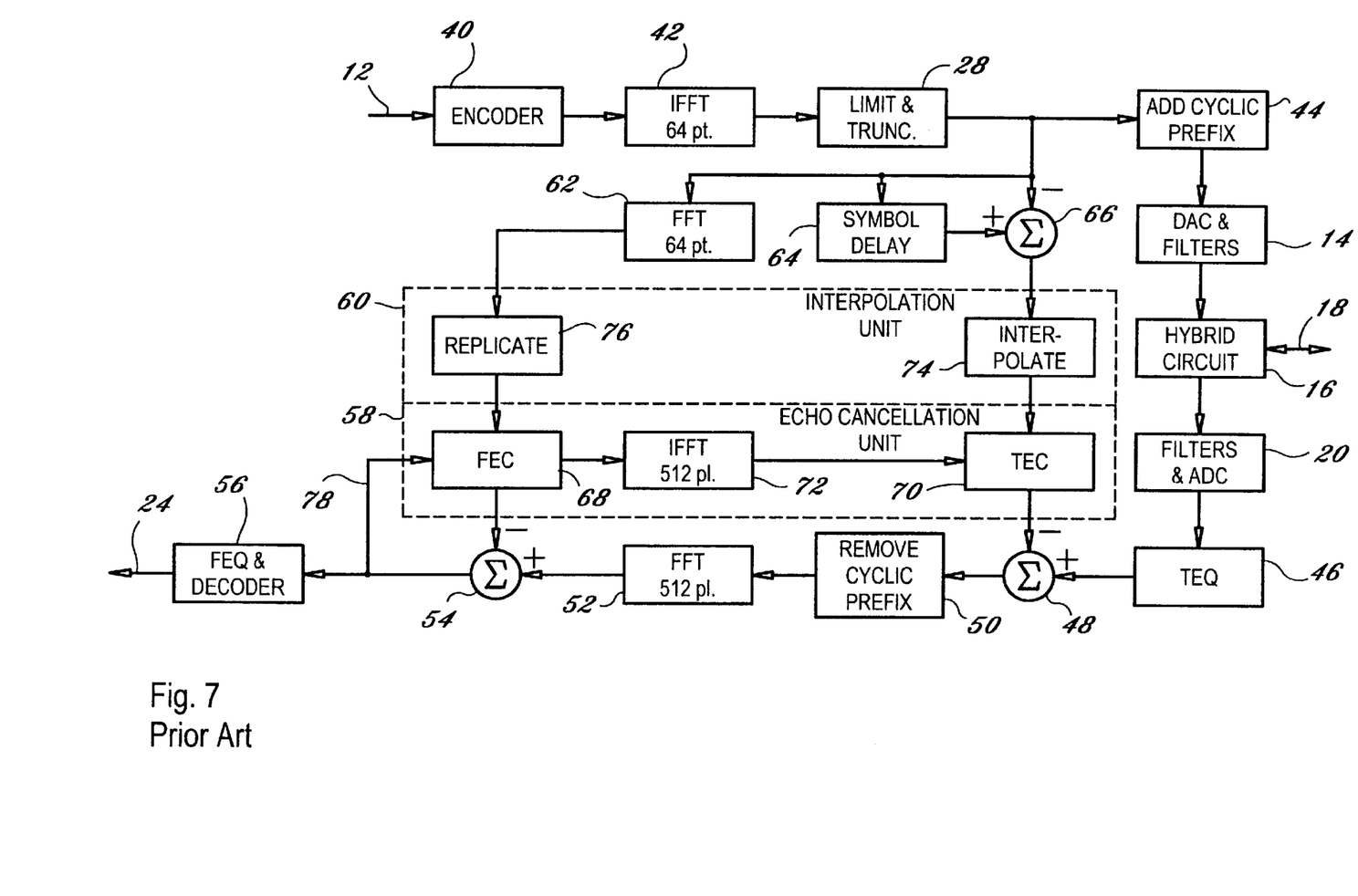
Figure 8:
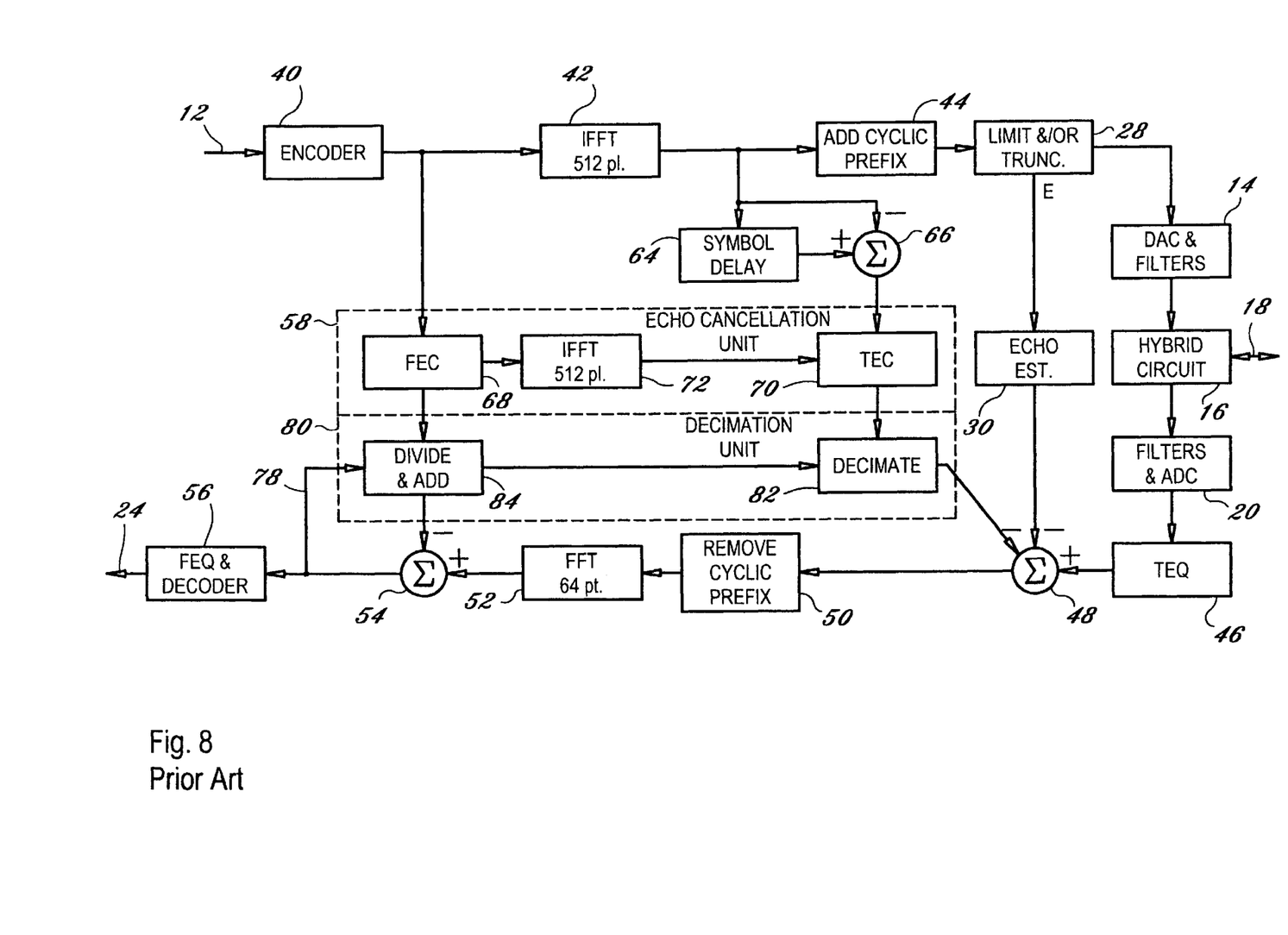
Figure 9:
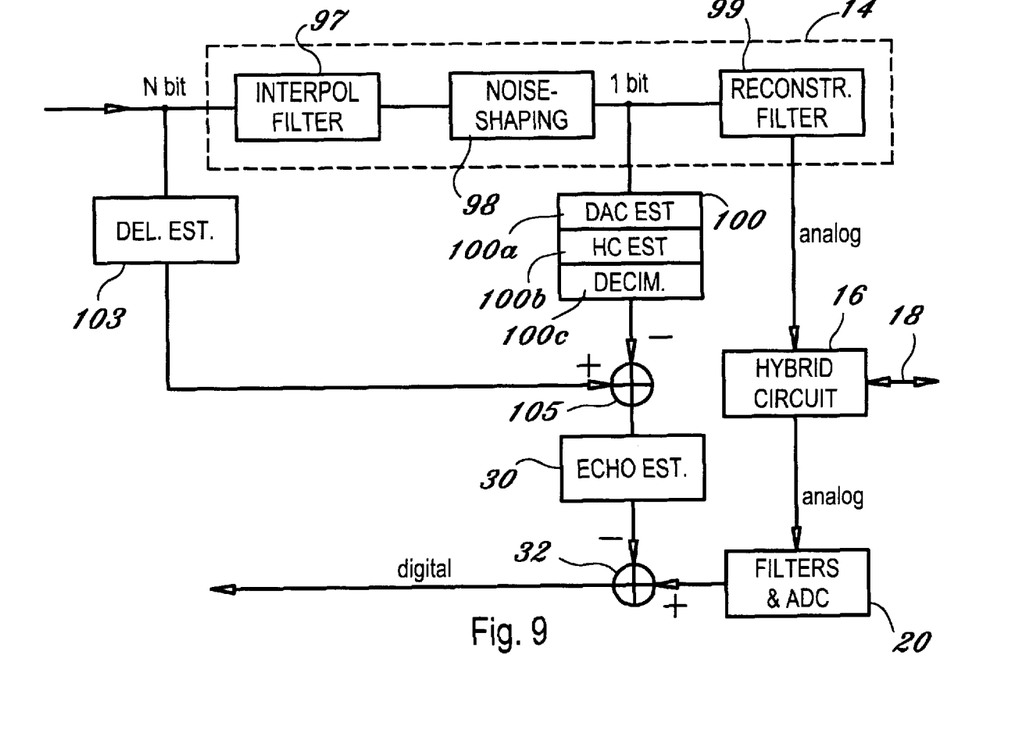
FIG. 9 is a block diagram of a first embodiment of a circuit section containing an AD converter, a hybrid circuit and a DA converter according to the invention.

In accordance with the invention shown in FIG. 9, the digital-to-analog converter 14 contains, in particular, an interpolation filter 97, to which the output signal of the signal-processor 28 is fed, a digital noise-shaping filter 98 connected downstream of the interpolation filter 97, and an analog reconstruction filter 99 connected, in turn, downstream of said noise-shaping filter. The signal that can be tapped at an output of the analog reconstruction filter 99 was digitally interpolated in the interpolation filter 97 and thus conditioned for oversampling.

The downstream noise-shaping filter 98 generates from the N bit of a digital signal at an output of the interpolation filter 97 a 1-bit wide pulse modulation signal with the use of a plurality of, for example 1 to 6, feedback loops. An analog signal is reconstructed from the 1-bit wide digital bit stream by the analog reconstruction filter such as, for example, an RC circuit or a switched-capacitor network.

The output signal of the digital noise-shaping filter 98 is fed in a development of the invention to an approximation filter 100 downstream of which, in turn, the echo-estimating filter 30 is connected. The output signal of the echo-estimating filter 30 is in this case subtractively superimposed on the output signal of the analog-to-digital converter 20 by a subtracting device 32.

The approximation filter 100 serves the purpose of approximating the analog reconstruction filter 99. It is therefore essentially an estimation filter for approximating the behavior of the digital-to-analog converter 14 that is involved. Therefore, the analog signal at the output of the analog reconstruction filter 99 is approximated by the digital signal at the output of the approximation filter 100.

Moreover, the oversampled signal in the approximation filter 100 is reduced to the sampling rate used in the overall circuit configuration. The behavior of the hybrid circuit 16 and of the analog transmission-reception path 18 are approximated adaptively by the echo-estimating filter 30. It is advantageous in this case that both linear signals and nonlinear signals, produced during digital noise shaping, for example, are compensated.

Moreover, the above-mentioned embodiment is extended by use of a delay-estimating filter 103, to which, on an input side, the output signal of the signal-processor 28 is fed, and whose output signal is subtractively superimposed on the output signal of the approximation filter 100 by a subtracting device 105 and fed together therewith to the echo-estimating filter 30. The result of subtracting the output signals of the delay-estimating filter 103 and approximation filter 100 is that only the nonlinear signal component produced in the digital noise-shaping filter 98 is passed on and, consequently, that the echo-estimating filter 30 can be implemented in a simpler way and thus with a lower outlay. The delay-estimating filter 103 is constructed in this case in such a way that the time delay and the amplitude response of the interpolation filter 97 are compensated. The linear echo component can, if appropriate, already be compensated in this case by the echo cancellation unit 26.

Furthermore, in addition to a DAC estimation filter 100a, the approximation filter 100 can also have a hybrid estimation filter 100b, which approximates the non-linearities, for example of the line drivers in the hybrid circuit 16, and a digital decimation filter 100c.

Figure 10:
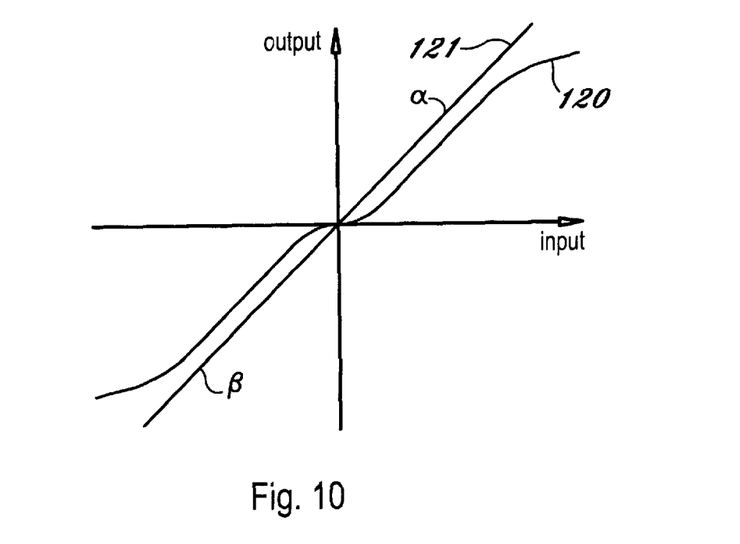
FIG. 10 is a graph showing a characteristic of an approximation filter for the embodiment according to FIG. 9.

In accordance with FIG. 10, in the case of the hybrid estimation filter 100b the approximation is performed, for example, according to a nonlinear characteristic 120 with a limiting, for example approximately logarithmic profile by comparison with a linear profile 121 which is applied to the digital bit stream at the input (or at the output) of the digital decimation filter 100c. The characteristic 120 can be a function, for example, of different coefficients α, β, which—if desired—can be set.

Figure 11:
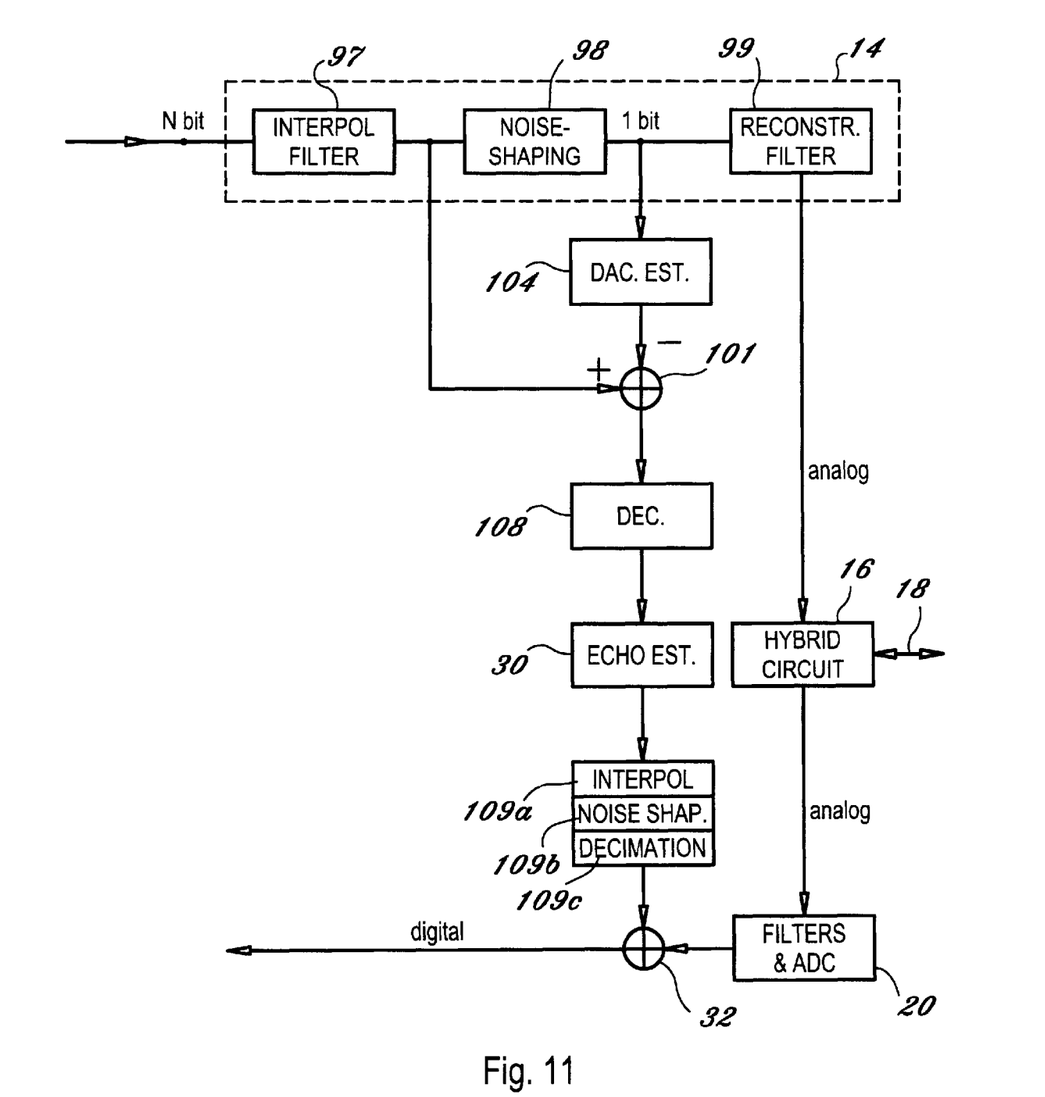
FIG. 11 is a block diagram of a second embodiment of the circuit section containing the AD converter, the hybrid circuit and the DA converter.

In the exemplary embodiment in accordance with FIG. 11, the embodiment according to FIG. 9 the invention is modified as a development in such a way that a dedicated digital decimation filter 108 is used to reduce the sampling rate. The decimation filter 108 being connected downstream of a DAC estimation filter 104 replacing the approximation filter 100, identical elements in the exemplary embodiments of FIGS. 9 and 11 being provided with identical reference symbols. Consequently, the echo-estimating filter 30 is located downstream of the digital decimation filter 108.

In accordance with a development, the output signal of the interpolation filter 97 is subtractively superimposed by a subtraction device 101 on the output signal of the DAC estimation filter 104, and thus fed to the digital decimation filter 108. By splitting up the approximation filter 100 of FIG. 9 into a purely approximating ("estimating") part and into a decimation part, the subtraction by the subtracting device 101 is carried out at high sampling rates, it being possible to omit compensation of the delay time.

Finally, the output signal of the echo-estimating filter 30 is combined in series with the output signal of the analog-to-digital converter 20 by the subtracting device 32 with the interposition of a further interpolation filter 109a, a further digital noise-shaping filter 109b and a further decimation filter 109c. The configuration composed of the further interpolation filter 109a, the further digital noise-shaping filter 109b and the further decimation filter 109c serves to simulate the transmission properties of the analog-to-digital converter 20.

It goes without saying that the sampling rate is higher at the output of an interpolation filter than at its input, and that the sampling rate is lower at the output of a decimation filter than at its input.

We claim:

1. A circuit configuration for two-wire/four-wire conversion, comprising:

a receiver having an input side to be coupled to a digital two-wire reception path and receiving a digital signal;

a signal-processor connected downstream of said receiver and emitting a first signal and a second signal;

an echo-cancellation unit receiving the first signal and emitting a third signal;

a digital-to-analog converter receiving the second signal and emitting a fourth signal, said digital-to-analog converter having an interpolation filter receiving the second signal, a digital noise-shaping filter connected downstream of said interpolation filter, and an analog reconstruction filter connected in turn, downstream, of said noise-shaping filter, said digital noise-shaping filter generating a seventh signal;

a hybrid circuit to be coupled to an analog four-wire transmission-reception path and receiving the fourth signal, said hybrid circuit emitting a fifth signal;

an analog-to-digital converter receiving the fifth signal and emitting a sixth signal;

an approximation filter connected downstream of said digital noise-shaping filter and receiving said seventh signal and generating a filtered output signal;

an echo-estimating filter disposed downstream of said approximation filter and receiving the filtered output signal from said approximation filter and outputting an output signal;

a subtractor receiving the output signal from said echo-estimating filter being subtractively superimposed with the sixth signal and outputting a transmit signal; and a transmitter receiving the transmit signal, having an output side to be coupled a digital two-wire transmission path, and emitting a digital transmitted signal to the digital two-wire transmission path.

2. The circuit configuration according to claim 1, including:

a delay-estimating filter having an input side receiving the second signal and generating an output signal; and a further subtractor receiving the output signal from said delay-estimating filter and the filtered output signal of said approximation filter, said further subtractor generating a modified filtered output signal received by said echo-estimating filter.

3. The circuit configuration according to claim 1, including a dedicated digital decimation filter connected downstream of said approximation filter and provided for reducing a sampling rate.

4. The circuit configuration according to claim 3, including a hybrid estimating filter disposed downstream of said dedicated digital decimation filter and approximating a behavior of said hybrid circuit.

5. The circuit configuration according to claim 1, including:

a further interpolation filter receiving the output signal from said echo-estimating filter;

a further digital noise-shaping filter disposed and connected downstream from said further interpolation filter; and a further decimation filter disposed between said further digital noise-shaping filter and said subtractor.

* * * * *